(12) United States Patent
Allen et al.

(10) Patent No.: US 7,274,508 B2
(45) Date of Patent: Sep. 25, 2007

(54) REFLECTIVE PROJECTION SCREEN WITH ANGLED SIDEWALLS

(75) Inventors: William J. Allen, Corvallis, OR (US); John M. Koegler, Corvallis, OR (US); Anurag Gupta, Corvallis, OR (US); Lawrence C. Mann, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 10/966,447

(22) Filed: Oct. 15, 2004

(65) Prior Publication Data

US 2006/0082873 A1 Apr. 20, 2006

(51) Int. Cl.
*G03B 21/60* (2006.01)
*G02B 5/136* (2006.01)
*G02B 1/10* (2006.01)

(52) U.S. Cl. .................... 359/459; 359/546; 359/584
(58) Field of Classification Search ................ 359/443, 359/459, 546, 584
See application file for complete search history.

(56) References Cited

U.S. PATENT DOCUMENTS

| | | | |
|---|---|---|---|
| 1,279,262 A | 9/1918 | Clark | |
| 1,550,880 A | 8/1925 | Clark | |
| 2,107,038 A * | 2/1938 | McLennan | 359/445 |
| 2,942,254 A * | 6/1960 | Beers | 348/834 |
| 3,575,773 A * | 4/1971 | Courtot | 428/118 |
| 3,612,650 A | 10/1971 | Fuji | |
| 4,184,762 A * | 1/1980 | Guzman | 355/1 |
| 4,235,512 A * | 11/1980 | Brasfield et al. | 359/541 |
| 4,235,513 A | 11/1980 | Vlahos | |
| 4,877,308 A * | 10/1989 | Okuno et al. | 359/601 |
| 4,911,529 A | 3/1990 | Van De Ven | |
| 6,317,263 B1 | 11/2001 | Moshrefzadeh | |
| 6,335,828 B1 | 1/2002 | Hashimoto et al. | |
| 6,700,712 B2 | 3/2004 | Servatius et al. | |
| 6,751,019 B2 * | 6/2004 | DeSanto et al. | 359/460 |
| 6,928,219 B2 * | 8/2005 | Arkas | 385/116 |
| 2004/0022506 A1 | 2/2004 | Arkas | |
| 2005/0128583 A1 * | 6/2005 | Poulsen | 359/459 |

FOREIGN PATENT DOCUMENTS

| | | |
|---|---|---|
| EP | 0 294 122 A | 12/1988 |
| EP | 1 324 113 A | 7/2003 |
| WO | WO 2005/059640 A | 6/2005 |

* cited by examiner

*Primary Examiner*—Diane Lee
*Assistant Examiner*—Magda Cruz

(57) ABSTRACT

A projection screen includes a plurality of passive elements each having a sidewall surrounding a surface, wherein said sidewall is configured to attenuate light.

19 Claims, 5 Drawing Sheets

REFLECTIVE PROJECTION SCREEN WITH ANGLED SIDEWALLS

BACKGROUND

A popular class of display system is a front projection system. A front projection system projects an image onto a reflective screen which displays the image. Front projection systems are generally suited for relatively dark rooms because front projection screens indiscriminately reflect light incident to the surfaces with substantially equal efficiency. Light from the projector can be diluted by light from room lights, windows, pixel-to-pixel interference, and/or other ambient light.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

DETAILED DESCRIPTION

An embodiment of a screen, such as a passive projection screen, is provided herein that has a plurality of individual passive elements formed thereon to enhance the contrast ratio of an image displayed in the presence of ambient light. Further, the passive projection screen may be formed of readily available materials using fabrication techniques. These techniques may be used to adjust the performance characteristics of the passive projection display by varying the dimensions of the passive elements.

An embodiment of a display system will be described herein that makes use of an exemplary passive projection screen. The passive projection screen will then be discussed, followed by a discussion of the configuration of individual passive elements, including passive elements that have angled sidewalls and passive elements that are configured to be used with rear projection systems. Thereafter, an exemplary method of forming a passive projection screen will be discussed in more detail.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification may possibly not be referring to the same embodiment.

Embodiment of a Display System Having a Passive Projection Screen

Figure 1:
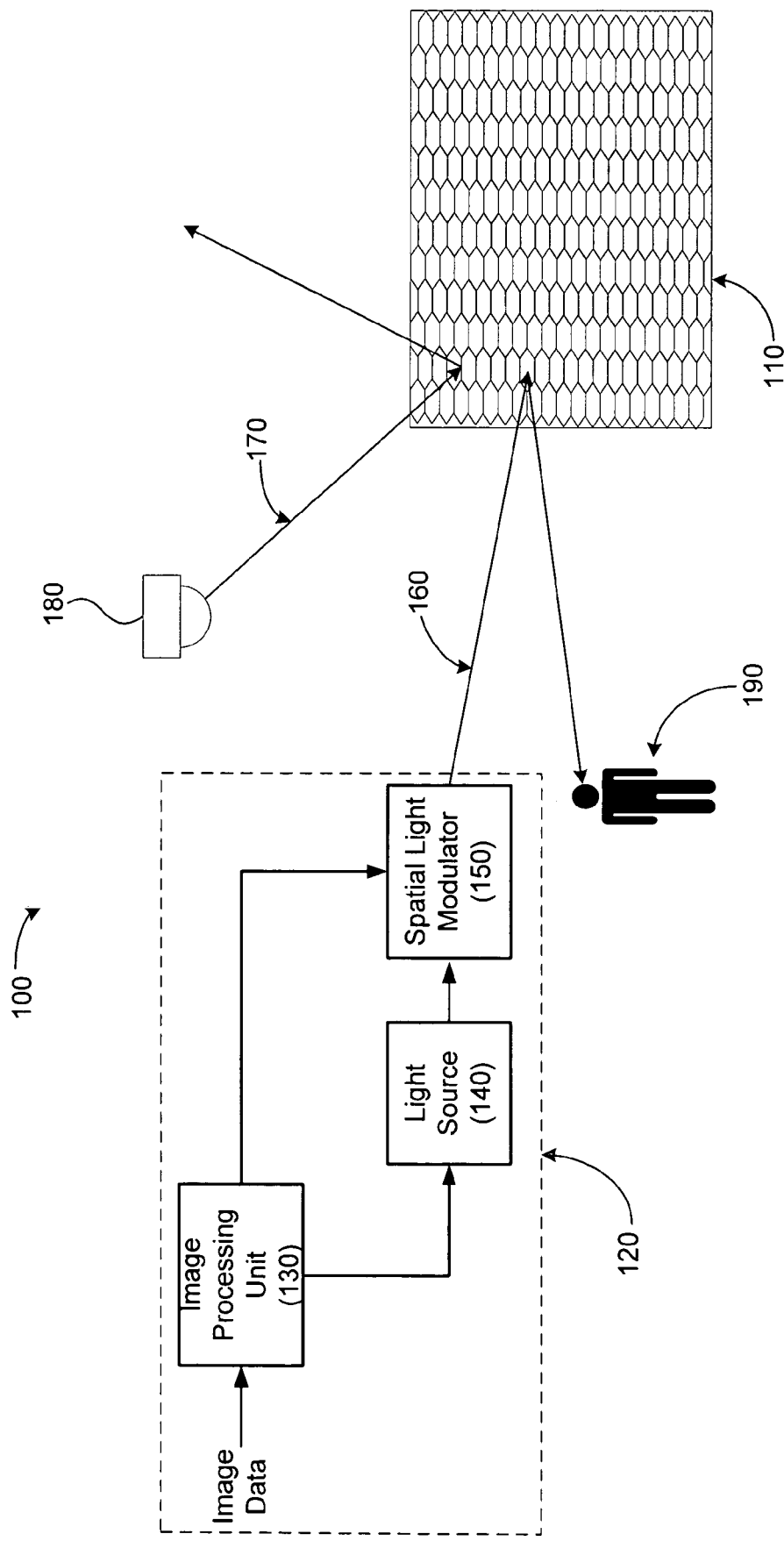
FIG. 1 illustrates a schematic view of an exemplary display system that includes an exemplary passive projection screen according to one exemplary embodiment.

FIG. 1 illustrates an exemplary display system (100) according to one exemplary embodiment. In particular, the display system (100) shown is a frontal projection system. The display system (100) generally includes an embodiment of a passive projection screen, such as passive projection screen (110), and an exemplary projector assembly, projector assembly (120). The projector assembly (120) described is exemplary only and may be modified or changed as best serves a particular application.

Image data is input into an image processing unit (130). The image data defines an image that is to be displayed by the projector assembly (120). While one image is illustrated and described as being processed by the image processing unit (130), it will be understood by one skilled in the art that a plurality or series of images may be processed by the image processing unit (130). The image processing unit (130) performs various functions including controlling the illumination of a light source (140) and controlling a spatial light modulator (SLM) (150).

The light source (140) provides a beam of light to the spatial light modulator (150). The light source (140) may be, but is not limited to, a high pressure mercury lamp, a xenon bulb, or an array of light emitting diodes.

The incident light may be modulated in its phase, intensity, polarization, or direction by the modulator (150). Thus, the SLM (150) of FIG. 1 modulates the light output by the projector assembly (120) based on input from the image processing unit (130) to form an image-bearing beam (160) that is eventually displayed or cast onto the passive projection screen (110).

The image-bearing beam (160), as well as ambient light (170) from an ambient light source (180), are both incident upon the passive projection screen (110). As will be discussed in more detail below, the passive projection screen (110) directs a substantial portion of the image-bearing beam (160) back toward a viewer (190) or viewers within a viewing cone, while attenuating the ambient light (170) directed back toward a viewer (190) or viewers within a viewing cone. The attenuation of a portion of the ambient light (170) increases the contrast ratio of the image displayed on the passive projection screen (110). The configuration of the passive projection screen (110) will now be discussed in more detail.

Passive Projection Screen

Figure 2:
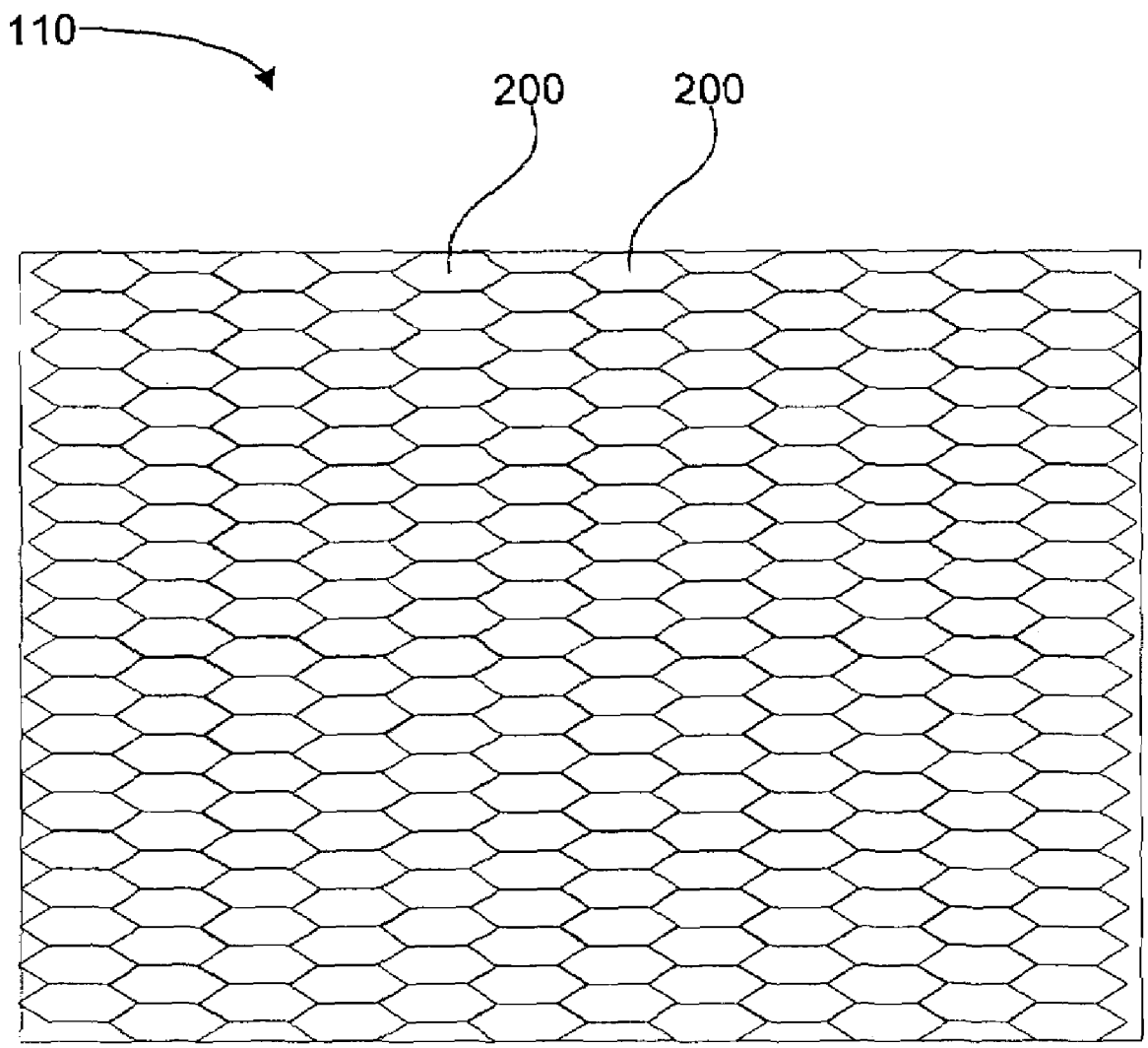
FIG. 2 illustrates an exemplary passive projection screen according to one exemplary embodiment.

FIG. 2 illustrates the passive projection screen (110) in more detail. The passive projection screen (110) includes a plurality of individual passive elements (200) formed thereon to enhance the contrast ratio of an image displayed in the presence of ambient light. As previously discussed, the individual passive elements (200) direct light from a display system back toward a user while reducing the amount of light from ambient sources that is directed back to the viewers.

The passive projection screen (110) is composed of a matrix of individual passive elements (200) in the form of hexagonal wells. The matrix of hexagonal passive elements (200) forms a honeycomb pattern. As will be discussed in more detail below, the design of the passive projection screen (110) can be adjusted to vary the angle of view versus the degree of rejection of ambient light. In particular, the height of the walls of each of the passive elements (200) may be increased to attenuate more light. As the height of the walls of the passive element increases, the size of the viewing cone decreases. Accordingly, the height of the passive elements (200) may be adapted for the viewing cone to be used in any given application. The exemplary passive elements (200) discussed with reference to FIG. 2 are generally hexagonal in shape and may, according to one exemplary embodiment have a size of approximately 0.2 mm to about 1.0 mm or more with sidewalls having aspect ratios (height divided by width) of about 10:1 or 20:1. The elements may be of any suitable size and shape. For example, other shapes include, without limitation, squares, rectangles, and circles.

Further, the passive projection screen (110) can be tuned independently for rejecting ambient light from the light sources located above or below the projection screen or for rejecting ambient light located to the sides of the projection screen. The configuration of the passive projection screen (110) will now be discussed in more detail with reference to an individual passive element (200).

Configuration of Individual Passive Elements

Figure 3A:
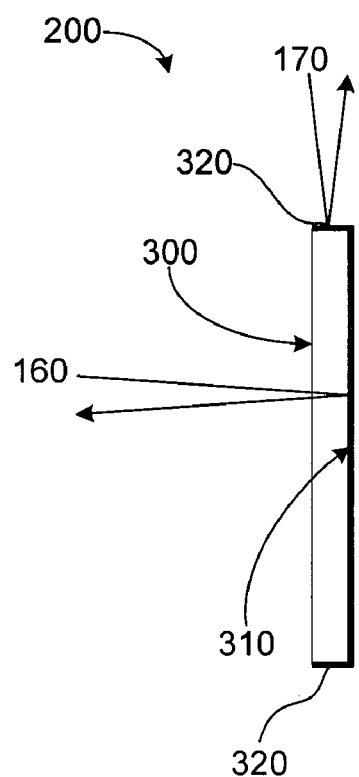
FIG. 3A illustrates a partial cutaway side view of an exemplary passive element of a passive projection screen according to one exemplary embodiment.
Figure 3B:
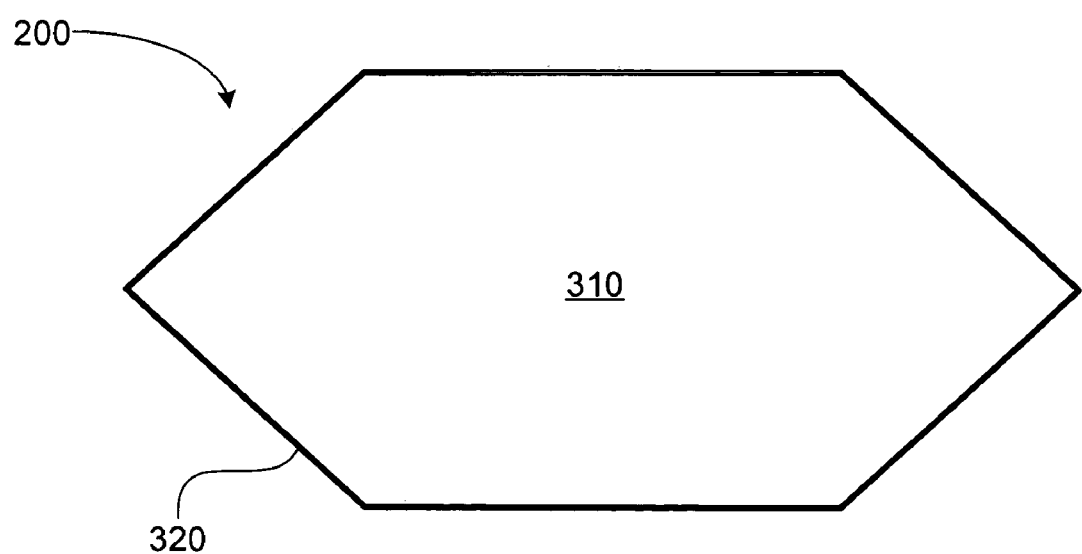
FIG. 3B illustrates a frontal view of an exemplary passive element of a passive projection screen according to one exemplary embodiment.

FIGS. 3A-3B illustrates an individual element, such as a passive element, in more detail. In particular, FIG. 3A illustrates a cutaway side view of an individual passive element (200), while FIG. 3B illustrates a front view of the passive element (200). As shown in FIG. 3A, the passive element (200) includes a front plane (300) and a rear plane or floor (310). A hexagonal well is formed in the front plane (300) such that the second or rear plane (310) forms a floor that is surrounded by sidewalls (320). The sidewalls (320) shown are substantially perpendicular (within the range of variation that may result from the technique used to fabricate the passive element) to both the front and rear planes (300, 310). In one exemplary embodiment, the sidewalls (320) and the floors are each covered with matte white paint and treated to act as scattering reflectors.

Further, as shown in FIG. 3A, ambient light (170) from an ambient light source (180), such as a ceiling light fixture, that is incident on the passive element (200) is far from normal with respect to the rear plane (310). Accordingly, the sidewalls (320) shade some of the rear plane (310) from this high-angle ambient light. Consequently, this ambient light is not efficiently directed into the eyes of viewers. Alternatively, projected light from the image-bearing beam (160) arrives nearly parallel to the sidewalls (320). The image-bearing beam (160) is then reflected out of the passive element (200) and is relayed to the eyes of a viewer or audience. Accordingly, a substantial portion of the image-bearing beam (160) is perceived by a viewer or audience while at least some of the ambient light (170) is reflected away from the viewer or audience. The portion of incident ambient light (170) that is reflected away from the viewer or audience may be controlled by varying the dimensions of the passive elements, including the depth of the sidewalls (320).

Deeper sidewalls (320) increase the contrast ratio by reducing the amount of ambient light that reaches the viewer. However, there is a tradeoff between the contrast ratio and the angle of view. More specifically, as the sidewalls (320) increase in depth, portions of the image-bearing beam (170) are also attenuated from the viewer by the sidewalls (320). Consequently, the depth of the sidewalls (320) affects, at least in part, the contrast ratio and viewing angle of the passive projection screen (110).

In one exemplary embodiment, a passive projection screen (110; FIG. 1) includes a plurality of passive elements (200) each having dimensions of approximately 0.5 mm in depth by approximately 1.0 mm in width and height. The base and sidewalls (320) of the exemplary embodiment were deposited using three-dimensional printing techniques. In addition, the surfaces of the sidewalls (320) and rear planes (310) were coated with a matte white paint.

The performance characteristics of the passive projection screen (110; FIG. 1) were then analyzed under controlled high ambient light conditions and dark conditions and compared to the optical characteristics of an 8½"×11" size sheet of high-quality printer paper when receiving light from a typical digital projector. The results of the comparison are summarized below, in which the sensed light from the passive projection screen are characterized by the designation "Hex" and the sensed light from the sheet of paper is designated as "Paper." The pixels displayed are either white (W) or black (K) in order to calculate the maximum contrast ratio (CR).

| | Light coming off screen (cd/m²) to viewer centered in front of screen | |
|---|---|---|
| | Fluorescent Lights On | Fluorescent Lights Off |
| Hex W | 547 | 348 |
| Hex K | 195 | 0.52 |
| Hex CR | 2.8 | 669 |
| Paper W | 705 | 413 |
| Paper K | 303 | 0.63 |
| Paper CR | 2.3 | 656 |

As shown above, with the ambient lights on, the passive projection screen attenuated the ambient light and increased the contrast ratio from 2.3 with a plain white surface to 2.8 with the passive projection screen. In the dark, where ambient light was substantially reduced, the structure of the passive projection screen had very little effect on the contrast ratio. Accordingly, the hexagonal structure of the individual passive elements increases the contrast ratio of a displayed image.

As previously discussed, the dimensions of each of the passive elements (200) may be varied or adjusted to control the performance characteristics of the passive projection screen (110; FIG. 1). In particular, the width of the passive elements (200), which may be measured about a horizontal axis of the passive element, may be approximately 200 μm or less. Further, the width and height of the passive elements (200) may be independently varied to attenuate ambient light from overhead light sources differently than light sources located to the sides of the passive projection screen (110; FIG. 1).

The exemplary projector screen (110; FIG. 1) discussed above included passive elements (200) having a single surface treatment applied thereto to reduce the amount of light that is directed back to the viewers. The projector screen (110; FIG. 1) may also be treated with multiple surface treatments. For example, the sidewalls (320) may be treated with a light absorbing surface treatment, such as gloss black paint, while the rear plane (310) may be treated with a diffuse reflecting surface, such as matte white paint.

As previously discussed, light incident on such a screen comes from a variety of sources. For example, an incoming light ray that is nearly perpendicular to the rear plane (310), may graze one of the sidewalls (320). The angle between such an incoming light ray and the sidewall (320) will be beyond a critical angle of the sidewall (320), and the incoming light ray will be substantially reflected by the sidewall (320). Thereafter, the incoming light ray will be incident on the rear plane (310), which then directs the light ray to the viewer.

In other cases, a light ray that arrives nearly perpendicularly to the sidewalls (320) will penetrate the light absorbing surface treatment where the light is absorbed. By absorbing a portion of the ambient light incident on each passive element, the passive projection screen (110; FIG. 1) further decreases the amount of ambient light directed back to a viewer, thereby increasing the contrast ratio of an image displayed in the presence of ambient light.

Figure 4:
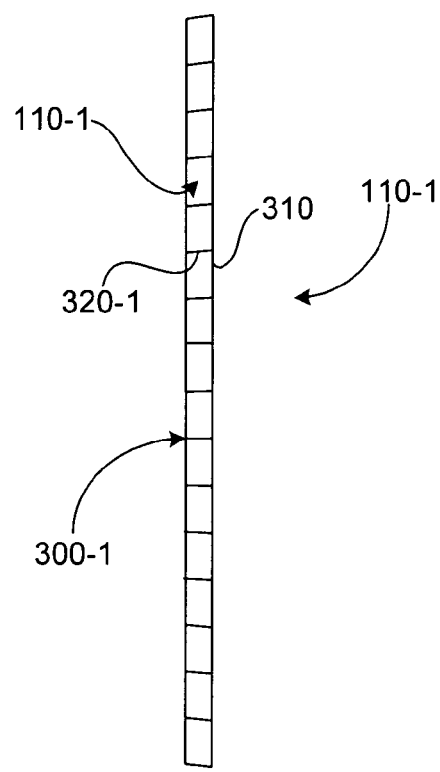
FIG. 4 illustrates a schematic view of an exemplary passive projection screen according to one exemplary embodiment.

The passive projection screens described thus far have made use of sidewalls that are generally perpendicular to the rear plane or floors (310) of each of the passive elements. As shown in FIG. 4, a passive projection screen (110-1) may be formed having sidewalls (320-1) that are tilted slightly. The size of the sidewalls (320-1) has been exaggerated for ease of reference. The sidewalls (320-1) shown are tilted such that if each of the sidewalls were extended, they would converge near a single point (not shown).

These sidewalls (320-1) may be formed using a photo imaging process, which may include a contact print process. In such a process, a layer of SU8 epoxy is first deposited to form the front plane (300-1). Thereafter, a mask is formed that includes a field of black hexagons separated by thin clear lines. The thin clear lines correspond to the shape of the frontal view of the passive elements (320-1). This mask is placed on the front plane (300-1), such as through contact printing. Thereafter, the front plane (300-1) with the mask applied thereto is exposed to light. Light passes through the thin clear lines while the dark black hexagons block the transmission of light. Light is thus selectively passed through the thin clear lines to the SU8 material. As light passes through the layer of material, it exposes the SU8 epoxy. This exposed material is then consolidated in a post exposure baking step, which causes molecular cross linking of the exposed SU8 epoxy. Thereafter, the unconsolidated material, which is the material below the mask that has not been exposed, is removed leaving the consolidated material of the sidewalls (320-1). Accordingly, the material that is exposed and later consolidated to form the sidewalls depends, at least in part, on how light is directed to the mask.

The light used in exposing the layer of SU8 epoxy may be provided by a single point source. The light passing through the layers of SU8 would be parallel to rays of light drawn from the point source, thereby exposing the material in the tilted fashion shown in FIG. 4. As previously discussed, this exposed material is later consolidated to form solid walls, after which the non-exposed material is removed. As a result, the sidewalls (320-1) of passive elements nearest the point source would have nearly perpendicular walls, while other passive elements would have tilted walls. Accordingly, the sidewalls would be tilted or biased toward a single point. The resulting passive projection screen (110-1) may focus light from the area of a single source, thereby reducing the amount of ambient directed to the viewer. Accordingly, the dimensions of the passive elements may be varied to control several performance characteristics.

Figure 5:
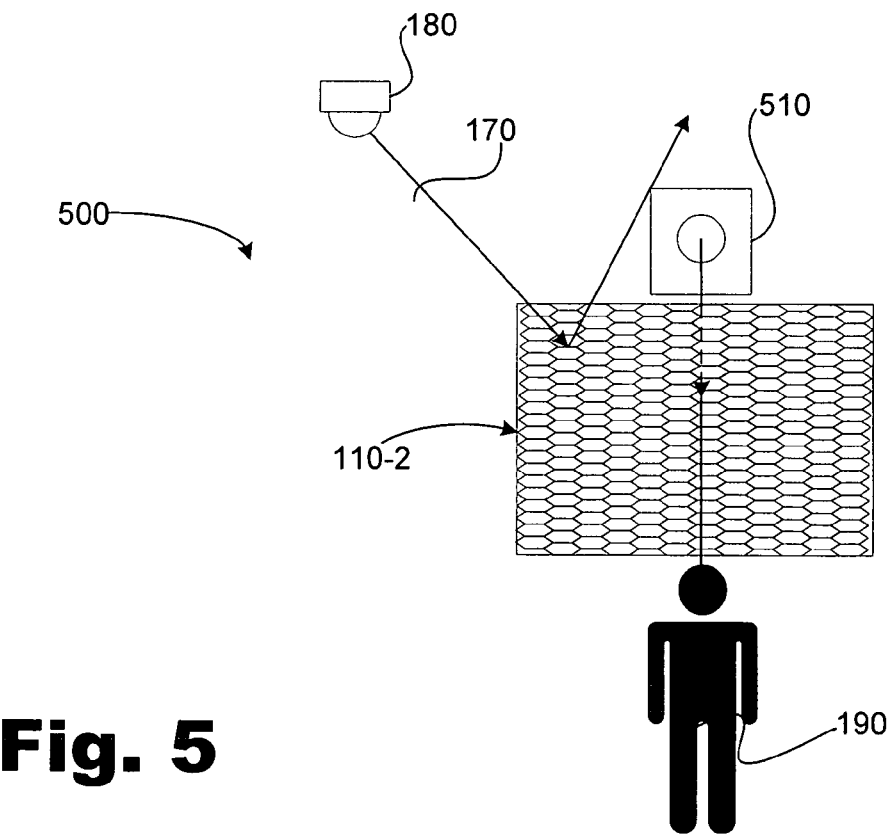
FIG. 5 illustrates a schematic view of an exemplary display system according to one exemplary embodiment.

Further, the passive elements may be adapted for use with rear projection display systems. For example, as shown in FIG. 5, an embodiment of a rear projection display system (500) includes a passive projection screen (110-2) configured to be used with a rear projection assembly (510). In such a configuration, the rear plane (310; FIG. 3) of each of the passive elements (300; FIG. 3) is formed of a transparent material. As a result, light from the rear projection assembly (400) is able to pass through the passive projection screen (110-2) to be viewed by a viewer (190) or viewers. Further, the sidewalls (320; FIG. 3) of each of the passive elements (300; FIG. 3) shields a portion of the rear plane (310; FIG. 3) as previously discussed, thereby increasing the contrast ratio of the image.

Accordingly, the passive projection screen attenuate ambient light to thereby increase the contrast ratio of an image displayed thereon. In addition, as will now be discussed in more detail, passive projection screens may be readily formed. Further, the size of the viewing angle, as well as the horizontal and vertical ambient light dissipating properties of the passive projection screens may be readily adjusted by varying the dimensions of the passive elements.

Method of Forming a Passive Projection Screen

Figure 6:
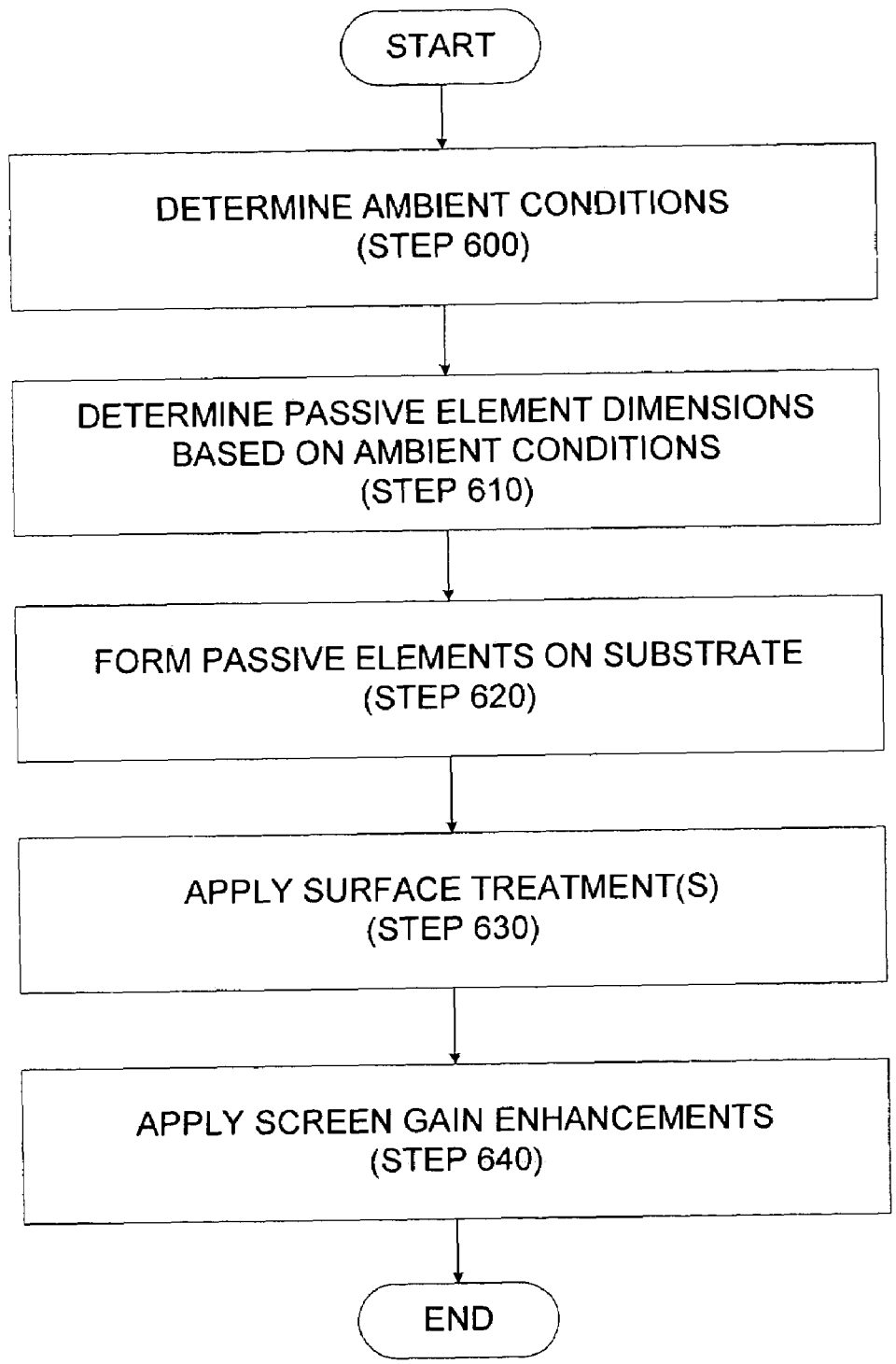
FIG. 6 is a flowchart illustrating an exemplary method of forming a passive projection screen according to one exemplary embodiment. Throughout the drawings, identical reference numbers designate similar, but possibly not identical, elements.

FIG. 6 is a flowchart illustrating an exemplary method of forming a passive projection screen. As previously introduced, the performance characteristics of the passive projection screen may be adjusted to suit environmental conditions by varying the dimensions of the passive elements. Accordingly, the exemplary method begins by determining the ambient conditions (step 600). These ambient conditions may include determining the likely location of ambient light sources and the desired viewing angle of the passive projection screen. For example, ambient light sources are frequently located overhead, such as in ceiling light fixtures. In other situations, light sources may be located primarily to the sides of the passive projection screens, such as may be the case where table lamps or wall lamps are used extensively. Further, some applications allow the use of a relatively narrow viewing angle, such as when the display system is located in a long, narrow room. Other factors, which include without limitation, the geometry of the projector, the geometry of the screen, and the characteristics of the audience may also be used in determining the dimensions of the passive elements.

These ambient conditions are then used to determine the dimensions of the passive elements (step 610). For example, where a higher contrast ratio is desired, the depth of the passive elements may be relatively large. Further, in the case where ambient light is provided primarily by overhead ambient light sources, the passive elements may be elongated along a horizontal axis. Similarly, where ambient light is provided primarily by ambient light sources located to the side of the projection screen, the passive elements may be elongated along a vertical axis.

The passive elements are formed on a substrate (step 620). The substrate may be any suitable material, including materials commonly used in forming projection screens. The passive elements themselves may be formed of any suitable material, including, without limitation, SU8 epoxy resin. Several approaches may be used to form the passive elements that include, without limitation, etching, micro-embossing, or three-dimensional printing.

Once the passive elements have been formed on the substrate (step 620), the surfaces are coated with at least one surface treatment (step 630). As previously discussed, the surfaces may be covered with a single surface treatment, such as matte white paint, to form surfaces which are scattering reflectors. These coatings may be applied by any suitable means including, without limitation, contact printing. Further, the surfaces may be treated with multiple surface treatments, such as treating the surfaces of the sidewalls with a light absorbing surface treatment while treating the floors or rear planes of each of the passive elements with a reflective material. Further, the rear planes of each of the passive elements may be formed with a transparent substrate.

In addition, the surfaces may be treated with screen gain enhancements (step 640) such as mica or glass beads that are applied to the surfaces of the passive projection screen. These particles increase the amount of light reflecting off the rear plane of the passive projection screen and back to the viewer.

Accordingly, the present method provides for the formation of a variety of passive projection screens. Formation of such passive projection screens by the disclosed techniques reduces the costs associated with production. Further, the present method provides for the formation of passive projection screens with characteristics that are well suited to the operating environment of the display system.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the claimed subject matter be defined by the following claims.

What is claimed is:

1. A reflective projection screen, comprising:
a plurality of passive elements each having a set of angled sidewalls, such that if extended would converge near a single point, surrounding a surface that directs light back toward a user, wherein said set of angled sidewalls are configured to absorb light.

2. The projection screen of claim 1, wherein each of said set of angled sidewalls form a generally hexagonal shape to create a plurality of general hexagonal passive elements.

3. The projection screen of claim 2, wherein said general hexagonal passive elements are elongated along a horizontal axis.

4. The projection screen of claim 2, wherein said general hexagonal passive elements are elongated along a vertical axis.

5. The projection screen of claim 2, wherein said plurality of general hexagonal passive elements form a honeycomb type pattern.

6. The projection screen of claim 1, and further comprising at least one surface treatment applied to said passive elements.

7. The projection screen of claim 6, wherein said surface treatment comprises matte white paint.

8. The projection screen of claim 1, and further comprising a plurality of surface treatments.

9. The projection screen of claim 8, wherein said plurality of surface treatments comprises a light absorbing surface treatment applied to said set of angled sidewalls and a reflective treatment applied to said surface.

10. The projection screen of claim 1, and further comprising a scattering reflective surface formed on said passive elements.

11. The projection screen of claim 1, and further comprising a screen gain enhancement applied to said passive elements.

12. The projection screen of claim 11, wherein said screen gain enhancement comprises mica.

13. The projection screen of claim 11, wherein said screen gain enhancement comprises glass beads.

14. The projection screen of claim 1 wherein the plurality of passive elements is composed of a matrix of individual passive elements.

15. The projection screen of claim 1 wherein the plurality of passive elements have a size of approximately 0.2 mm to about 1.0 mm.

16. The projection screen of claim 1 wherein the sidewalls have a height and width and the ratio of the height to the width is about 10:1 or about 20:1.

17. The projection screen of claim 1 wherein the projection screen is tuned to reject ambient light from above the projection screen and from ambient light located to the side of the projection screen.

18. The projection screen of claim 1 wherein at least one of the plurality of passive elements includes a rear plane surrounded by the sidewalls connecting to a front plane.

19. The projection screen of claim 18 wherein an incoming light ray at an angle nearly perpendicular to the sidewalls is absorbed.

* * * * *